US006984941B2

(12) United States Patent
Hiramoto et al.

(10) Patent No.: US 6,984,941 B2
(45) Date of Patent: Jan. 10, 2006

(54) EXTREME UV RADIATION SOURCE AND SEMICONDUCTOR EXPOSURE DEVICE

(75) Inventors: Tatumi Hiramoto, Tokyo (JP); Kazuaki Hota, Sagamihaa (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 36 days.

(21) Appl. No.: 10/793,042

(22) Filed: Mar. 5, 2004

(65) Prior Publication Data

US 2004/0183038 A1 Sep. 23, 2004

(30) Foreign Application Priority Data

Mar. 17, 2003 (JP) ............................ 2003-071873

(51) Int. Cl.
*H01J 7/24* (2006.01)
*G01J 1/00* (2006.01)

(52) U.S. Cl. ........................... 315/111.01; 315/111.21; 250/504 R

(58) Field of Classification Search ........... 315/111.01, 315/111.11, 111.21, 111.81; 250/504 R, 250/505.1, 495.1

See application file for complete search history.

(56) References Cited

U.S. PATENT DOCUMENTS

2004/0149937 A1 * 8/2004 Hiramoto ................ 250/504 R
2005/0016462 A1 * 1/2005 Yamazaki ................... 118/726

OTHER PUBLICATIONS

Choi et al., "Detailed space-resolved characterization of a laser-plasma soft-x-ray source at 13.5-nm wavelength with tin and its oxides", J. Opt. Soc. Am. B/ vol. 17, No. 9, Sep. 2000, pp. 1616-1625.
Toshihisa Tomie, "Laser Produced Plasma Light Sources Present Status of Laser Produced Plasma EUV Sources Development", J. Plasma Fusion Res. vol. 79, No. 3 (2003) pp. 234-239.

* cited by examiner

*Primary Examiner*—Trinh Vo Dinh
(74) *Attorney, Agent, or Firm*—Nixon Peabody LLP; David S. Safran

(57) ABSTRACT

A usable 13.5 nm radiation source in which Sn is the radiation substance, in which rapid transport with good reproducibility is possible up to the plasma generation site and in which formation of detrimental "debris" and coagulation of the vapor are suppressed as much as possible is achieved using emission of Sn ions in that $SnH_4$ is supplied continuously or intermittently to the heating/ excitation part, is subjected to discharge heating and excitation or laser irradiation heating and excitation, and thus, is converted into a plasma from which extreme UV light with a main wavelength of 13.5 nm is emitted.

20 Claims, 4 Drawing Sheets

EXTREME UV RADIATION SOURCE AND SEMICONDUCTOR EXPOSURE DEVICE

BACKGROUND OF THE INVENTION

1. Field of the Invention

The invention relates to an extreme UV radiation source which is used as the light source for semiconductor exposure, and a semiconductor or very fine machines exposure device using this radiation source.

2. Description of the Related Art

Extreme UV radiation (13.5 nm in the EUV wavelength range) is considered as an exposure light source for use in a lithography process in processes for producing a semiconductor which will be even more highly integrated in the future. It is imagined that currently 10-valent Xe ions and roughly 10-valent Sn ions are promising as the radiation substance which emits this radiation.

These highly ionized ions are often produced in high temperature plasmas. This generation of plasmas is being performed, at present, by heating by discharge energy or laser energy.

SUMMARY OF THE INVENTION

For the most part, there are two processes for producing plasma by heating and excitation, specifically:

"laser heating process" in which a gaseous, liquid or solid "radiation substance in itself" or a "substance which contains a radiation substance" is heated with laser light, made into a high temperature plasma in a certain temperature range, and thus, the given radiation is obtained; and "discharge process" in which a high current is allowed to flow for only a short time in a "radiation substance in itself" or a "substance which contains a radiation substance" so that a high temperature plasma is produced and the given radiation is obtained.

Furthermore, there are the following two requirements with respect to the particle density of the radiation substance.

In order to suppress absorption of the radiation used for exposure, it is more advantageous if, in the space from the heating and excitation part (radiation part) up to the exposure surface, all particle densities of the components of the substance which contains the radiation substance and all other substances are low.

On the other hand, it is necessary for the particle density of the radiation substance in the radiation part (the expression "particle density" is defined as the sum of the particle densities of neutral atoms which are average in space and time in the plasma within the time interval in which 13.5 nm radiation is carried out, and the ions of all stages) is high in order to achieve a high radiation density. It is desirable that it be greater than or equal to $1\times10^{24}/m^3$, if possible.

A radiation substance is generally heated and excited at a certain position in a device for generating plasmas with a high speed repetition frequency of a few thousand Hz. At this frequency, intermittent extreme UV (EUV) radiation is carried out. Here, the important point is that it is more advantageous, the higher the ratio of the 13.5 nm radiation energy to the energy which is consumed for heating and excitation, the higher the transformation efficiency. The reason for this is that, according to the plasma generation, a solid, a liquid or a toxic gas or the like is formed at the same time which reduces the reflection factor of an optical system, such as a mirror or the like, and that this amount is increased, the more the supplied energy increases.

Therefore, if the energy of plasma generation is efficiently converted into 13.5 nm radiation, the supplied energy can be kept at a low level. At the same time, the condition can also be implemented under which the supplied energy for the radiation which is unnecessary for exposure, for formation of a substance which is detrimental to the optical system or the like, is not distributed as much as possible. In this way, the disadvantage of heat elimination or the like is also reduced even more.

On the other hand, the lower limit of the exposure treatment time per semiconductor wafer is limited. For this reason, an irradiance on the resist surface of at least a certain value must be reached. To do this, the product of the amount of light radiation at 13.5 nm which is emitted each time with high speed repetitive heating and excitation of the plasmas, and the repetition frequency must reach at least a certain value. At the same time, the absorption of the 13.5 nm radiation, especially by the gas which is present from the radiation source, plasma must be suppressed as far as the resist surface as much as possible. The radiation path (=optical path) is therefore evacuated in a vacuum device. When a gaseous substance within the device with a small radiation absorption cross-sectional area of this wavelength is used, with an attenuation factor with low radiation which emerges from the radiation part, the resist can be reached; this is advantageous.

The components which form the light source part, of course, also the plasma component, are subjected to an extremely high temperature or come into contact with particles with high energy, by which they vaporize, are abraded and spray. For a substance in which, even when this sprayed debris forms, the efficiency of the optical system, especially the reflection factor, is not degraded prematurely and in which the reflector material is not degenerated either, the damage is reduced.

When Xe is the radiation substance, Xe after the 13.5 nm radiation in the gaseous state is introduced in the radiation path. The radiation substance in itself therefore does not become debris. However, the Xe introduced in the radiation path has a great absorption cross-sectional area of 13.5 nm radiation. Besides the fact that its radiation absorption cross-sectional area at 13.5 nm is large, Xe is an extremely good radiation substance. However, that Xe has a low transformation efficiency of the plasma heating-excitation energy into 13.5 nm radiation energy, is regarded more and more often as the most seriously disadvantageous. Conversely, Sn has a transformation efficiency of the plasma heating-excitation energy into 13.5 nm radiation energy which is several times greater than that of Xe. Thus, Sn in extremely good in this respect.

The J. Opt. Soc. Am. B/Vol. 17, no. 9/September 2000, p. 1616 to p. 1625 discloses a technique in which metallic Sn is used as the target material which is irradiated, heated and excited with Nd:YAG laser light and in which extreme UV light with a main wavelength of 13.5 nm is emitted. However, since Sn is a solid at a temperature which is near room temperature, it is not transported as easily and quickly with good reproducibility as Xe as far as the plasma generation site. It is even worse that there is the danger of formation of a large amount of "debris" in the case of heating and excitation since it is a solid at room temperature. Since the vapor pressure is relatively low, it accumulates in the area with a low temperature within the device when it returns from the plasma state into the normal gaseous state. In this way, extremely serious damage is caused.

SUMMARY OF THE INVENTION

The invention was devised to eliminate the above described disadvantage in the prior art. Thus, a primary object of the invention is to devise a usable 13.5 nm radiation source in which Sn is the radiation substance, in which rapid transport with good reproducibility is possible up to the plasma generation site and in which formation of detrimental "debris" and coagulation of the vapor are suppressed as much as possible.

For this purpose, there are the following desirable properties of a substance which contains a radiation substance.

(1) Even if during heating and excitation the substance is sprayed, the substance which contains the radiation substance must be a substance in which this formation of the sprayed substance does not cause either degradation of the efficiency of Si, Mo, the resist and the components comprising the device composed of the radiation source and exposure system, or the like. It is advantageous when the decomposition product of the substance which has emerged from the heating/excitation part and which contains the radiation substance in an area with a low temperature which is close to room temperature returns to molecules with a high vapor pressure.

(2) The substance which contains the radiation substance must be able to be supplied at a fixed time, in a fixed amount and at a fixed location with good reproducibility.

(3) The substance which contains the radiation substance must be a substance which has high transformation efficiency of the plasma heating-excitation energy into 13.5 nm radiant light.

The aforementioned three points are desirable. Therefore, the inventors considered $SnH_4$ to be a substance which contains the radiation substance Sn. It can be imagined that by using $SnH_4$, Sn can be quickly supplied to the heating-excitation part because $SnH_4$, due to its melting point of −146° C. and its boiling point of −51.8° C., is always a gas at a normal room temperature. The Sn present in the heating/excitation part returns to a large extent to the original $SnH_4$ with a high vapor pressure by recombination with $H_2$. Therefore, "debris" forms only to a small extent.

The object is achieved according to a first aspect of the invention for an extreme UV radiation source using emission of Sn ions in that $SnH_4$ (mono stannane) is supplied intermittently or continuously to the heating/excitation part, it is subjected to discharge heating and excitation or laser irradiation heating and excitation, it is thus converted into a plasma, and that extreme UV light with a main wavelength of 13.5 nm is emitted.

The object is achieved according to one development of the invention for an extreme UV radiation source in that $SnH_4$ is supplied to the above described heating/excitation part in the state of a liquid, gaseous or solid single phase or in the state of a multiphase in which at least two phases thereof coexist.

The object is achieved according to another development of the invention for an extreme UV radiation source in that liquid $SnH_4$ is mixed beforehand with at least one of liquid Kr, liquid Xe, and liquid $N_2$ and it is supplied to the above described heating/excitation part.

The object is achieved according to another development of the invention for an extreme UV radiation source in that a mixture of droplet-like $SnH_4$ with at least one of the gases $H_2$, $N_2$, He, Ar, Kr and Xe is supplied to the above described heating/excitation part.

The object is achieved according to a further development of the invention for an extreme UV radiation source in that solid $SnH_4$ is mixed beforehand with at least one of liquid He, liquid $H_2$, liquid Ar and liquid Kr and it is caused to spray out in the mixed state in the above described heating/excitation part.

The object is achieved in accordance with the invention for an extreme UV radiation source in that gaseous $SnH_4$ is mixed with at least one of the gases $H_2$, $N_2$, He, Ar, Kr and Xe and supplied to the above described heating/excitation part so that the Sn hydride which was decomposed in the heating/excitation part easily returns again to the original hydride.

The object is achieved according to yet another development of the invention for an extreme UV radiation source in that in the case of the above described use of $H_2$ as the substance which is mixed with the $SnH_4$ the molar ratio of H (hydrogen) atoms to the Sn of the $SnH_4$ is at least 2.

The object is achieved according to another development of the invention for an extreme UV radiation source in that between the end on one side of the extreme UV radiation of the above described heating/excitation part and an optical system in the immediate vicinity of this end on the radiation side a $H_2$ gas flow with a temperature of less than or equal to roughly room temperature is formed such that it crosses an evacuation flow which is being evacuated from the above described heating/excitation part and that thus vaporous Sn is made into a compound with a high vapor pressure.

The object is achieved according to a further development of the invention for an extreme UV radiation source in that the above described heating/excitation part is formed from a material with the main component being one of Ta, Nb, Mo and W with a narrow opening or a porous arrangement and that liquid $SnH_4$ is supplied to the inside through this narrow opening or the porous part from outside the above described heating/excitation part.

The object is achieved according to another development of the invention in a semiconductor exposure device in that the semiconductor exposure device is formed by a combination of the above described extreme UV radiation source with a reflector.

The expression "extreme UV radiation source," for purposes of the invention, is defined as an extreme UV radiation source of the discharge-heating/excitation type of the Z pinch type, an extreme UV radiation source of the discharge-heating/excitation type of the plasma focus type, an extreme UV radiation source of the discharge-heating/excitation type of the capillary type, and an extreme UV radiation source of the laser radiation type which is heated and excited by laser irradiation such as with a YAG laser or the like. These extreme UV radiation sources are described, for example, in the journal "Optics"; Japanese Optical Society, 2002, vol. 31, no. 7, pp. 545 to 552.

The expression "heating/excitation part," for purposes of the invention is defined as a part in which a radiation substance supplied to the radiation source is heated by a discharge or laser irradiation and shifted into an excited state in these extreme UV radiation sources.

The invention is further described below with reference to the accompanying drawings.

DETAILED DESCRIPTION OF THE INVENTION

Figure 1:
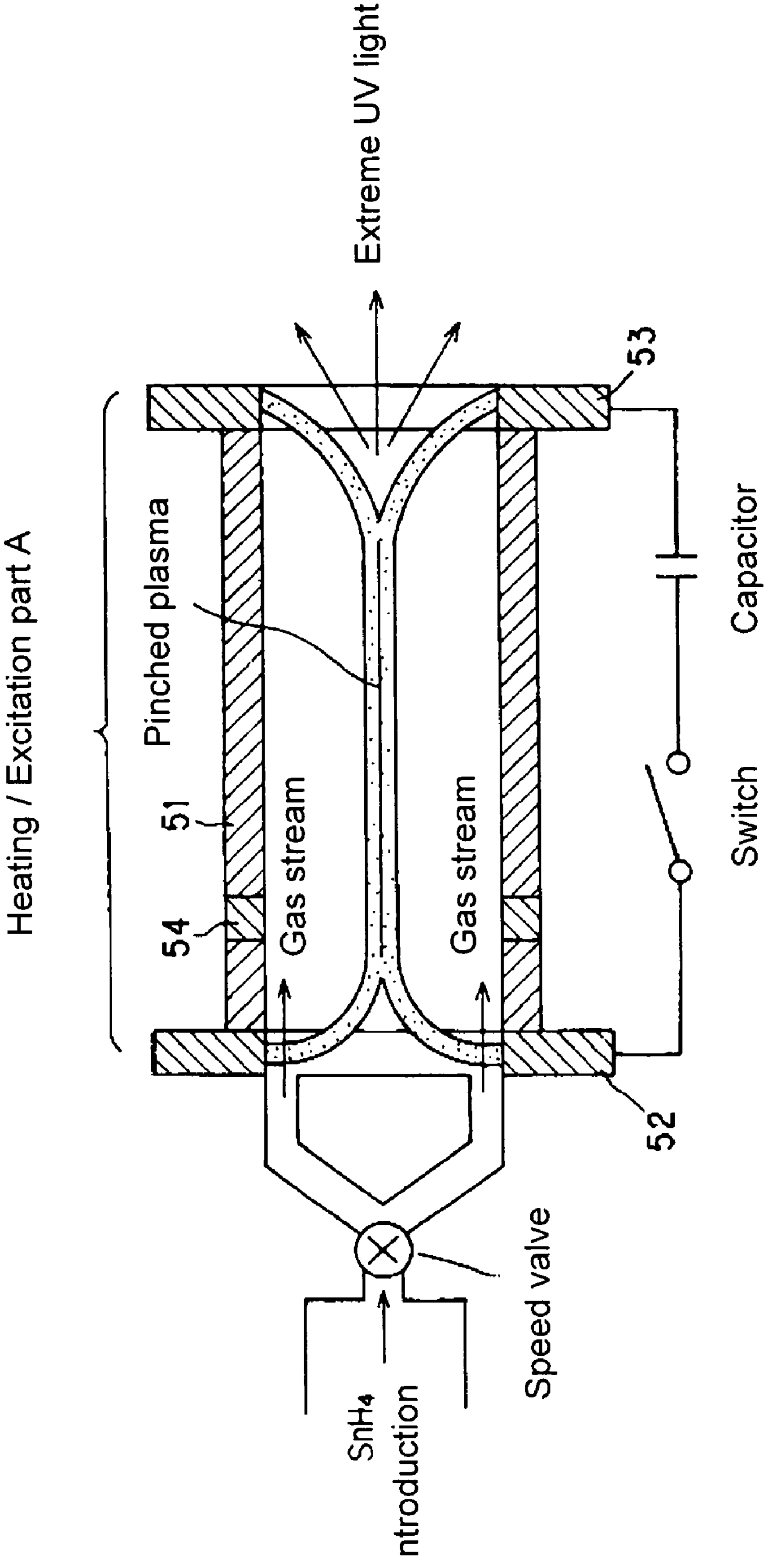
FIG. 1 is a schematic cross-sectional view of important parts of an extreme UV radiation source of the Z pinch type as an extreme UV radiation source in accordance with the invention.

FIG. 1 shows important parts of an extreme UV radiation source of the Z pinch type as an extreme UV radiation source of the invention. The substance which contains the radiation substance Sn is $SnH_4$ (monostannane). $SnH_4$ is continuously or intermittently supplied to the heating/excitation part A, it is subjected to discharge heating and excitation, it is thus converted into a plasma and emits extreme UV light with a main wavelength of 13.5 nm.

As is shown in FIG. 1, the important parts of the extreme UV radiation source of the Z pinch type have an arrangement in which there is a pair of electrodes 52, 53 on opposite ends of a cylindrical or corner-cylindrical discharge vessel 51. The discharge vessel 51 is formed from an insulator. This insulator, under certain circumstances, can be formed by the vessel wall of the device in which the discharge vessel is installed. For example, a certain amount of gaseous $SnH_4$ is sprayed into a hollow cylindrical shape from a side of the discharge vessel 51 which is opposite the end from which the light radiation of 13.5 nm wavelength emerges.

Simultaneously with spraying, a high frequency voltage is applied to the electrode 54 for high frequency auxiliary ionization and by means of a high frequency discharge the injected $SnH_4$ gas is subjected to auxiliary ionization. Directly afterwards, the main discharge is started, and thus, the discharge current is quickly caused to rise. If a large current flows at the location which is relatively near the wall of the discharge vessel on which there are a plurality of electron-ion pairs which have been formed by the auxiliary ionization, at the same time, an inductive magnetic field is formed. Due to the Lorentz force which is formed by this current and the magnetic field, the plasma is pinched in the axial direction of the discharge vessel, by which the density and the temperature of the plasma increase and by which strong radiation of 13.5 nm wavelength light emerges.

Figure 2:
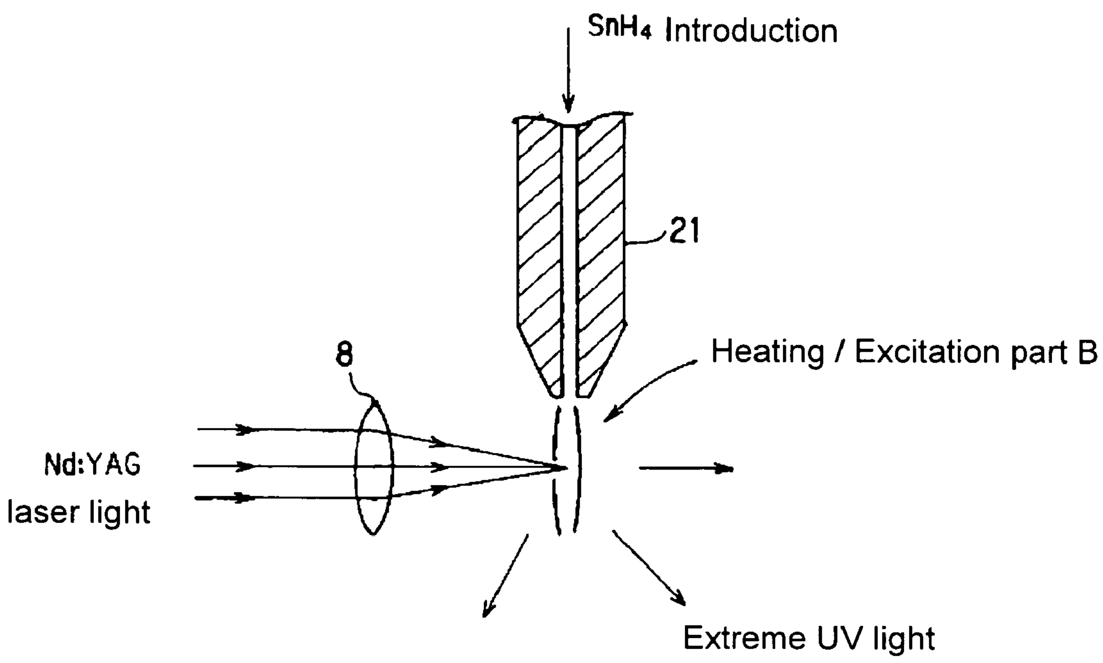
FIG. 2 is a schematic cross-sectional view of important parts of an extreme UV radiation source of the laser irradiation type as an extreme UV radiation source in accordance with the invention.

FIG. 2 shows an extreme UV radiation source of the laser radiation type as an extreme UV radiation source of the invention. The substance which contains Sn as the radiation substance is $SnH_4$ (monostannane). $SnH_4$ is continuously or intermittently supplied from the tip of a heat-resistant nozzle 21 to the heating/excitation part B in the vicinity of this tip, the Nd:YAG laser light is focused by means of a lens 8, irradiation and heating/excitation are carried out and a plasma is produced, by which extreme UV light with a main wavelength of 13.5 nm is emitted.

$SnH_4$ can be obtained as the substance which contains the radiation substance Sn, for example, by the following process.

In a stainless steel reaction chamber $AlLiH_4$ (lithium aluminum hydride) is reacted with $SnCl_4$ (tin tetrachloride) in ether at −30° C., chlorine (Cl) is substituted by hydrogen (H), and in this way, $SnH_4$ is obtained.

As the process for feeding $SnH_4$ into the heating/excitation part of the extreme UV radiation source, the resulting gaseous $SnH_4$ as the material of a single-phase gas can also be directly fed into the heating/excitation part. Alternatively, the gaseous $SnH_4$ (tin hydride) can be cooled to −52° C. and fed into the heating/excitation part as the material of single-phase liquid.

Furthermore, tin hydride $SnH_4$ which has been formed by the above described reaction can be cooled to −146° C., solidified, finely ground and introduced into the heating/excitation part as the material of solid single phase.

In addition, $SnH_4$ in the multiphase state in which at least two phases of a liquid single phase, a gaseous single phase and a solid single phase, coexist, can be fed into the heating/excitation part.

Furthermore the following is possible:

The tin hydride $SnH_4$ which has been formed by the reaction of $SnCl_4$ (tin tetrachloride) with $AlLiH_4$ (lithium aluminum hydride) is fed into liquid Xe, liquid Kr or into liquid $N_2$, liquefies it and produces a mixed liquid of the two. This mixed liquid is sprayed mechanically and directly into the heating/excitation part, and in this way, the particle density of the Sn atoms in the heating/excitation part is kept high. In this case, there is also the advantage that uniform mixing takes place since the two are liquids.

The tin hydride $SnH_4$ which has been formed by the reaction of $SnCl_4$ (tin tetrachloride) and $AlLiH_4$ (lithium aluminum hydride) is cooled to a temperature less than or equal to −52° C., and the liquified, droplet-like $SnH_4$ is mixed with at least one of the gases Xe gas, Kr gas, $N_2$ gas, $H_2$ gas and Ar gas and the mixture is atomized. The particle density of the Sn atoms in the heating/excitation part can be kept high by this measure.

Figure 3:
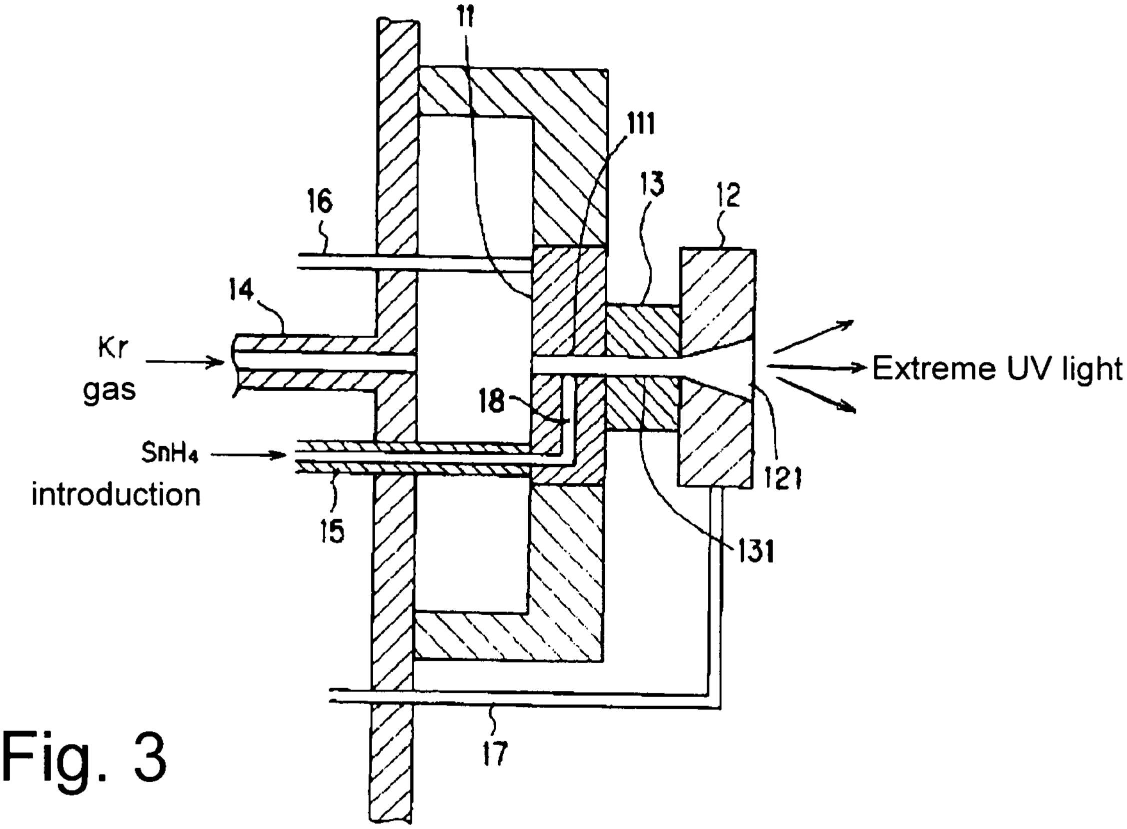
FIG. 3 is a schematic cross-sectional view of important parts of an extreme UV radiation source of the capillary type as an extreme UV radiation source in accordance with the invention.

FIG. 3 shows important parts of an extreme UV radiation source of the capillary type as an extreme UV radiation source. FIG. 3 is a cross section which was cut by a plane through which the optical axis of the extreme UV light which is emitted by the extreme UV radiation source passes. As is shown in FIG. 3, between the electrode 12 on the ground side and the electrode 11 on the high voltage side (which is made, for example, of tungsten), a capillary arrangement 13 is formed which comprises a cylindrical insulator, for example, of silicon nitride or the like, and which in the middle has a capillary 131 with a diameter of 3 mm.

A power source (not shown) is electrically connected to the electrode 12 on the ground side and to the electrode 11 on the high voltage side via electrical inlet wires 16, 17 and a high voltage from the power source is applied in a pulse-like manner between the electrode 12 on the ground side and the electrode 11 on the high voltage side. The electrode 12 on the ground side is normally grounded. For example, a negative high voltage is applied in a pulse-like manner to the electrode 12 on the ground side. The electrode 11 on the high voltage side and the electrode 12 on the ground side each have through openings 111, 121. These through openings 111, 121 and the capillary 131 of the capillary arrangement 13 are arranged coaxially and are continuously connected to one another.

As the substance which contains the radiation substance Sn, liquid $SnH_4$ is fed into the through openings 111, 121 and the capillary 131 from an opening 15 for feeding liquid $SnH_4$ into the through opening 111 which is connected to the capillary 131, by a nozzle 18. Kr gas is fed and blown into this through opening 111 from an opening 14 for feeding Kr gas. When a high voltage is applied in a pulse-like manner between the electrode 12 on the ground side and the electrode 11 on the high voltage side, within the capillary 131, as the heating/excitation part, a gas discharge is formed by which high temperature plasma is formed. In this way, extreme UV light of 13.5 nm wavelength is formed and emitted.

Even when cooled to less than or equal to −146° C., $SnH_4$ can be sprayed into the heating/excitation part as a solid in a state in which it is mixed with at least one of liquid He, $H_2$, Ar and Kr.

When gaseous $SnH_4$ is mixed with at least one of the gases $H_2$, $N_2$, He, Ar, Kr, and Xe and supplied to the above described heating/excitation part, mixing and handling are simplified.

In the case of using $H_2$ as the substance which is mixed into the $SnH_4$, it is desirable for the molar ratio of H (hydrogen) atoms to Sn to be at least 2. The reason for this is to increase the ratio with which Sn forms $SnH_4$ after discharge. The following can be imagined as the specific measure for this purpose.

Between the end of the above described heating/excitation part on the side of the extreme UV radiation and the optical system in the immediate vicinity of this end on the radiation side a $H_2$ gas flow with a temperature of less than or equal to roughly room temperature is formed such that it crosses an evacuation flow of vaporous Sn which has been evacuated from the heating/excitation part so that the vaporous Sn is converted to $SnH_4$ as a compound with a high vapor pressure.

The heating/excitation part can also be formed from a material with one of Ta, Nb, Mo, and W as the main component with a narrow opening or a porous arrangement, and liquid $SnH_4$ can be supplied to the inside through this narrow opening or the porous part from outside the heating/excitation part.

Figure 4:
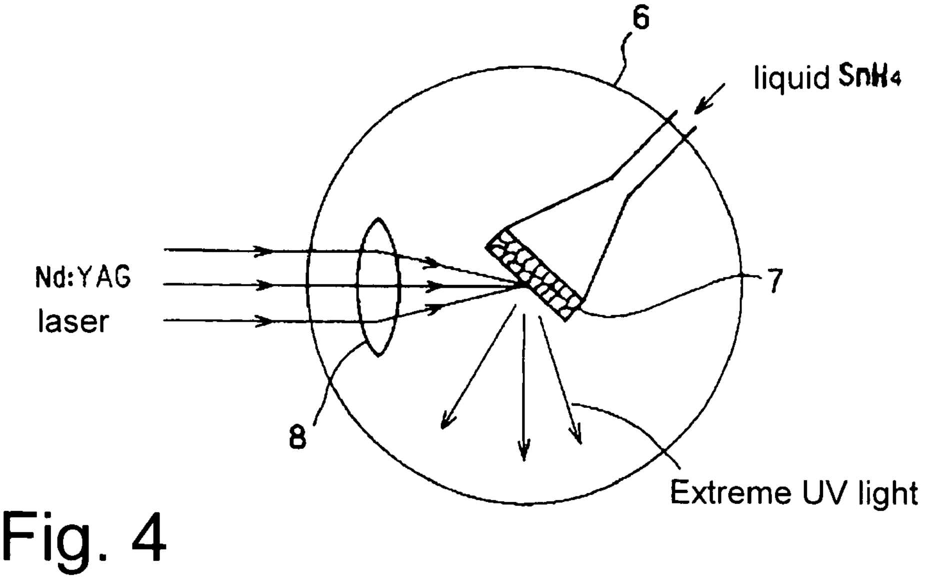
FIG. 4 shows a schematic of important parts of an extreme UV radiation source of the laser irradiation type as an extreme UV radiation source in accordance with the invention.

As is shown in FIG. 4, for an extreme UV radiation source of the laser irradiation type, a target 7 comprising the heating/excitation part is formed from a W (tungsten) sintered body with a porous structure. From the side which is opposite the laser irradiation surface, liquid $SnH_4$ is supplied. The location at which $SnH_4$ seeps to the surface of the target is irradiated with Nd:YAG laser light, heated/excited and converted into a plasma, by which extreme UV light with 13.5 nm is emitted. Furthermore, in this case, since there is the action that $SnH_4$ inherently cools the target, there is also the action that the cooling means of the device can be simplified.

This idea of the arrangement of the heating/excitation part as a porous arrangement is also used, besides for the above described extreme UV radiation source of the laser irradiation type, for the discharge vessel in the above described extreme UV radiation source of the Z pinch type and for the electrode parts for an extreme UV radiation source of the plasma focus type.

Figure 5:
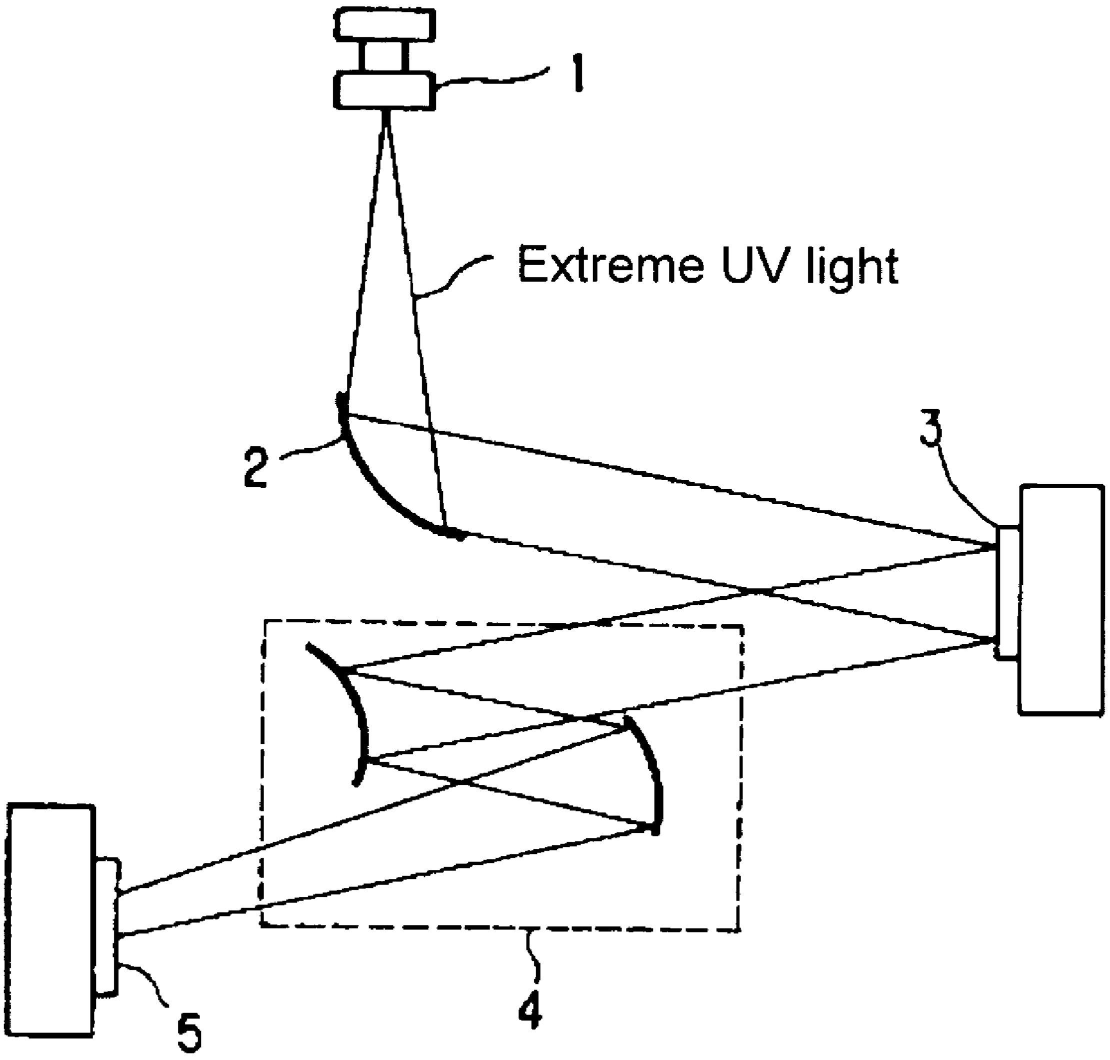
FIG. 5 shows a schematic of one example of an arrangement of a semiconductor exposure device using an extreme UV radiation source in accordance with the invention.

FIG. 5 shows one example of the arrangement in the case of an arrangement of a semiconductor exposure device using the above described extreme UV radiation source. For the semiconductor exposure device using the above described extreme UV radiation source, as is shown in FIG. 5, in a vacuum vessel, there are an extreme UV radiation source 1 using a capillary discharge or the like, a focusing mirror 2 with a reflection surface which is provided with a multilayer film, a mask of the reflection type 3, a projection-optics system 4, a wafer 5 and the like. The extreme UV light emitted from the extreme UV radiation source 1 is focused by means of a focusing mirror 2 and is emitted onto the mask of the reflection type 3. The light reflected by the mask 3 is projected via the projection-optics system 4 onto the surface of the wafer 5 by reduction. The focusing mirror 2 is formed by a combination of reflectors, in which a multilayer film of Si and Mo is formed on the glass substrate with a small coefficient of thermal expansion.

ACTION OF THE INVENTION

As was described above, in accordance with the invention, by using $SnH_4$ as the substance which contains Sn as the radiation substance, Sn can be supplied quickly to the heating/excitation part because $SnH_4$, due to its melting point of −146° C. and its boiling point of −51.8° C. is always present as a gas at normal temperature. The Sn which has emerged from the heating/excitation part returns by recombination with $H_2$ for the most part to the original $SnH_4$ with a high vapor pressure. In doing so, "debris" is formed only to a small extent.

The possibility of practical use for semiconductor exposure of a fine semiconductor can be increased by a semiconductor exposure device using the extreme UV radiation source of the invention.

What is claimed is:

1. An extreme UV radiation source using emission of Sn ions, comprising:
- a heating/excitation part,
- a feed device for intermittent or continuous supply of $SnH_4$ to the heating/excitation part, and
- an excitation device for producing a plasma in the heating/excitation part from which extreme UV light with a main wavelength of 13.5 nm is emitted.

2. The extreme UV radiation source as claimed in claim 1, wherein the excitation device is one of a discharge heating and excitation device and a laser irradiation heating and excitation device.

3. The extreme UV radiation source as claimed in claim 1, wherein the supply device supplies $SnH_4$ in one of a single-phase liquid, gaseous or solid and a multiphase state.

4. The extreme UV radiation source as claimed in claim 1, further comprising a mixing device for mixing liquid $SnH_4$ with at least one of liquid Kr, liquid Xe and liquid $N_2$ and for supplying the mixture to the heating/excitation part.

5. The extreme UV radiation source as claimed in claim 1, further comprising a mixing device for mixing droplet-form $SnH_4$ with at least one of the gases $H_2$, $N_2$, He, Ar, Kr, and Xe and for supplying the mixture to the heating/excitation part.

6. The extreme UV radiation source as claimed in claim 1, further comprising a mixing device for mixing solid $SnH_4$ with at least one of liquid He, liquid $H_2$, liquid Ar, and liquid Kr and for supplying the mixture to the heating/excitation part.

7. The extreme UV radiation source as claimed in claim 1, further comprising a mixing device for mixing gaseous $SnH_4$ with at least one of the gases $H_2$, $N_2$, He, Ar, Kr, and Xe to convert the $SnH_4$ which has been decomposed in the heating/excitation part back into $SnH_4$.

8. The extreme UV radiation source as claimed in claim 1, further comprising a mixing device for mixing hydrogen in an amount wherein the molar ratio of the H (hydrogen) atoms to the Sn of the $SnH_4$ is at least 2.

9. The extreme UV radiation source as claimed in claim 1, wherein between an end of the heating excitation part on a side where The Extreme UV radiation emerges and an optical system in an immediate vicinity of said end, a device for supplying an $H_2$ gas flow with a temperature less than or equal to room temperature is positioned for delivering the $H_2$ gas flow such that the $H_2$ gas crosses an evacuation flow which is being evacuated from the heating/excitation part in order to convert vaporous Sn into a compound with a high vapor pressure.

10. The extreme UV radiation source as claimed in claim 1, wherein the heating/excitation part is made of a material having a main component selected from the group consisting of Ta, Nb, Mo and W, has at least one narrow opening or a porous part, and wherein a device for supplying liquid $SnH_4$ is connected to an outer side of the at least one narrow opening or porous part.

11. A semiconductor exposure device, comprising a reflector and an extreme UV radiation source having a heating/excitation part, a feed device for intermittent or continuous supply of $SnH_4$ to the heating/excitation part, and an excitation device for producing a plasma in the heating/excitation part from which extreme UV light with a main wavelength of 13.5 nm is emitted.

12. The semiconductor exposure device as claimed in claim 11, wherein the excitation device is one of a discharge heating and excitation device and a laser irradiation heating and excitation device.

13. The semiconductor exposure device as claimed in claim 11, wherein the supply device supplies $SnH_4$ in one of a single-phase liquid, gaseous or solid and a multiphase state.

14. The semiconductor exposure device as claimed in claim 11, further comprising a mixing device for mixing liquid $SnH_4$ with at least one of liquid Kr, liquid Xe and liquid $N_2$ and for supplying the mixture to the heating/excitation part.

15. The semiconductor exposure device as claimed in claim 11, further comprising a mixing device for mixing droplet-form $SnH_4$ with at least one of the gases $H_2$, $N_2$, He, Ar, Kr, and Xe and for supplying the mixture to the heating/excitation part.

16. The semiconductor exposure device as claimed in claim 11, further comprising a mixing device for mixing solid $SnH_4$ with at least one of liquid He, liquid $H_2$, liquid Ar, and liquid Kr and for supplying the mixture to the heating/excitation part.

17. The semiconductor exposure device as claimed in claim 11, further comprising a mixing device for mixing gaseous $SnH_4$ with at least one of the gases $H_2$, $N_2$, He, Ar, Kr, and Xe to convert the $SnH_4$ which has been decomposed in the heating/excitation part back into $SnH_4$.

18. The semiconductor exposure device as claimed in claim 11, further comprising a mixing device for mixing hydrogen in an amount wherein the molar ratio of the H (hydrogen) atoms to the Sn of the $SnH_4$ is at least 2.

19. The semiconductor exposure device as claimed in claim 11, wherein between an end of the heating excitation part on a side where The Extreme UV radiation emerges and an optical system in an immediate vicinity of said end, a device for supplying an $H_2$gas flow with a temperature less than or equal to room temperature is positioned for delivering the $H_2$ gas flow such that the $H_2$ as crosses an evacuation flow which is being evacuated from the heating/excitation part in order to convert vaporous Sn into a compound with a high vapor pressure.

20. The semiconductor exposure device as claimed in claim 11, wherein the heating/excitation part is made of a material having a main component selected from the group consisting of Ta, Nb, Mo and W, has at least one narrow opening or a porous part, and wherein a device for supplying liquid $SnH_4$ is connected to an outer side of the at least one narrow opening or porous part.

* * * * *